United States Patent Office 3,097,949
Patented July 16, 1963

3,097,949
NOVEL COMPLEX SODIUM ALUMINUM ORTHO-PHOSPHATE REACTION PRODUCTS AND WATER-INSOLUBLE FRACTIONS THEREOF
Robert M. Lauck, Park Forest, Reginald E. Vanstrom, Crete, and James W. Tucker, Park Forest, Ill., assignors to Stauffer Chemical Company, New York, N.Y., a corporation of Delaware
No Drawing. Filed July 9, 1962, Ser. No. 208,571
2 Claims. (Cl. 99—115)

This invention relates to novel sodium aluminum phosphate reaction products of the approximate empirical composition:

$$xNa_2O \cdot yAl_2O \cdot 8P_2O_5 \cdot zH_2O$$

wherein $x$ is a number from 6 to 15, $y$ is a number from 1.5 to 4.5, and $z$ is a number from 4 to 40, certain water insoluble fractions which may be isolated therefrom, a method of preparing said reaction products and water insoluble fractions, and a process for emulsifying process cheese with said reaction products and water insoluble fractions.

The novel reaction products and water insoluble fractions of the present invention are initially prepared by reacting aluminum oxide, aluminum hydroxide (hydrated alumina) or sodium aluminate, and sodium hydroxide or sodium carbonate with concentrated phosphoric acid. This reaction is highly exothermic and proceeds to completion in a matter of minutes. The resulting reaction product is a mixture consisting of a water soluble fraction and a water insoluble fraction; the relative proportions being dependent upon at least several factors, including mainly, the aluminum content of the reaction mixture, the speed at which the reaction is accomplished, and the degree of agitation during reaction. The highest aluminum content will normally produce the highest ratios of insolubles to solubles (up to about 2:1) with less aluminum producing proportional lower ratios (down to about 1:2). The soluble fraction is composed of an intimate mixture of two or more sodium orthophosphates. From the hydrolysis characteristics of the insoluble fraction, it appears to be composed of two or more water insoluble sodium aluminum phosphates.

X-ray studies of the novel reaction products show the presence of one of two unique X-ray patterns, which will be hereafter referred to as Patterns A and B. Pattern A is found in the reaction products having high sodium content; that is, when $x$ in the above empirical composition is between 14 and 15. Pattern B is normally found where the sodium content is less than 14. Actually, at a low sodium content, i.e., between 6 and 9 gram atoms of sodium for each 8 gram atoms of phosphorus, only a faint pattern may be observed by qualitative X-ray examination, while at a sodium content between 9 and 14 gram atoms, the pattern is relatively intense and sharp. X-ray patterns for the insoluble fractions of the reaction products indicate the presence of the same unique patterns. When reaction products are prepared with high sodium content, i.e., 10–15 Na for each 8 P, X-ray lines for $Na_2HPO_4 \cdot 2H_2O$ are also usually observed to be present, superimposed on the pattern for the insoluble portion. These $Na_2HPO_4 \cdot 2H_2O$ lines are, of course, absent in the insoluble fractions after leaching.

The leached insoluble portion of the reaction product will slowly hydrolyze in warm water over a period of at least several weeks to furnish soluble sodium orthophosphates. The hydrolysis characteristics indicate that the insoluble fraction of the total reaction mixture is itself a novel composition comprising at least one hydrolyzable amorphous material and a crystalline material. Typical examples of the reaction products of the invention and the insoluble fractions which may be leached therefrom, are set forth in Table I, infra. Each reaction product was leached for a period of one hour in distilled water at room temperature and under constant agitation.

TABLE I

*Reaction Products Leached in Water (R.T.) for One Hour*

| Test sample | Reaction products (soluble and insoluble fractions) | | Insoluble fraction | |
|---|---|---|---|---|
| | Elemental analysis Na:Al:P (moles) | 25% slurry pH | Percent by weight of total reaction product | Elemental analysis Na:Al:P (moles) |
| 1 | 15:1.5:8 | 8.8 | 47.3 | 10.9:3:7.4 |
| 2 | 15:2.0:8 | 9.1 | 43.0 | 9.3:3:6.1 |
| 3 | 15:2.5:8 | 9.2 | 47.9 | 7.8:3:5.4 |
| 4 | 15:3.5:8 | 9.8 | 54.8 | 7.3:3:4.5 |
| 5 | 15:4.0:8 | 9.9 | 62.0 | 7.0:3:4.2 |
| 6 | 15:4.5:8 | 9.9 | 63.9 | 6.4:3:3.7 |
| 7 | 13:1.5:8 | 6.9 | 35.5 | 8.2:3:6.5 |
| 8 | 13:2.0:8 | 7.5 | 40.5 | 7.7:3:5.7 |
| 9 | 13:2.5:8 | 7.7 | 45.3 | 7.0:3:5.2 |
| 10 | 13:3.5:8 | 8.5 | 53.5 | 6.5:3:4.3 |
| 11 | 13:4.0:8 | 8.5 | 57.9 | 5.4:3:3.8 |
| 12 | 13:4.5:8 | 8.9 | 60.4 | 4.7:3:3.4 |
| 13 | 11:1.5:8 | 6.0 | 37.1 | 6.9:3:5.7 |
| 14 | 11:2.0:8 | 6.1 | 48.8 | 7.2:3:5.7 |
| 15 | 11:2.5:8 | 6.5 | 53.3 | 6.7:3:5.6 |
| 16 | 11:3.5:8 | 7.3 | 55.5 | 4.8:3:4.1 |
| 17 | 11:4.0:8 | 7.3 | 58.5 | 4.1:3:3.7 |
| 18 | 15:3.0:8 | 9.5 | 51.1 | 7.7:3:4.8 |
| 19 | 13:3.0:8 | 8.3 | 43.9 | 5.1:3:4.2 |
| 20 | 11:3.0:8 | 7.0 | 43.0 | 3.6:3:3.8 |
| 21 | 11:4.5:8 | 7.1 | 54.4 | 2.8:3:3.0 |
| 22 | 9:2.0:8 | 6.1 | 38.6 | 4.2:3:5.0 |
| 23 | 9:2.5:8 | 6.2 | 42.6 | 4.2:3:4.8 |
| 24 | 9:3.5:8 | 6.3 | 57.2 | 3.7:3:4.1 |
| 25 | 9:4.0:8 | 6.5 | 60.1 | 3.6:3:3.8 |
| 26 | 7:1.5:8 | 4.8 | 29.3 | 2.5:3:4.7 |
| 27 | 7:2.0:8 | 5.1 | 36.8 | 2.7:3:4.4 |
| 28 | 7:2.5:8 | 5.6 | 44.6 | 3.1:3:4.8 |
| 29 | 7:3.5:8 | 5.7 | 59.6 | 3.1:3:4.5 |
| 30 | 7:4.0:8 | 5.8 | 59.7 | 2.4:3:3.3 |

The soluble fractions leached from the reaction products shown in Table I contained substantially no aluminum and were found to have phosphorus present as essentially all orthophosphate ion.

Although the exact structural formulas of the insoluble sodium aluminum phosphate fraction are not presently known, this fraction may be characterized by the following empirical composition:

$$aNa_2O \cdot 3Al_2O \cdot bP_2O_5 \cdot cH_2O$$

wherein $a$ is a number between 2 and 11, $b$ is a number between 2.5 and 7.5, and $c$ is a number between 4 and 30. Since the aluminum remains in the hydrolysis residue, it has been selected as the constant in the above empirical composition. As mentioned heretofore, during the hydrolysis of the insoluble fraction, water soluble sodium orthophosphates are formed. These water soluble sodium orthophosphates have been determined to be mixtures of mono-, di-, or trisodium orthophosphates, the mono- and disodium orthophosphates predominating in solutions where the insoluble fraction has a low sodium content, while the trisodium phosphate is normally found where the sodium content is high. Accordingly, the soluble hydrolysis product formed from an insoluble fraction containing a mole ratio of Na:Al:P of about 5:3:6 will typically consist of about 80% monosodium orthophosphate and 20% disodium orthophosphate. On the other hand, when the insoluble fraction has a Na:Al:P mole ratio of about 8:3:6, the hydrolysis-formed sodium phosphate will be essentially a mixture of disodium orthophosphate and trisodium orthophosphate, the former slightly predominating.

Because of their slow "release" of sodium orthophosphates, the reaction products and/or the insoluble fractions thereof may be utilized to produce a "buffering effect" on the pH when incorporated in an aqueous system. This buffering effect may be controlled over a wide range since the sodium orthophosphates range between a pH value of 4.4 for monosodium orthophosphate and about 11.5 for trisodium orthophosphate. The hydrolysis characteristics of several insoluble fractions (at 100° C.) is compared in Table II. In the hydrolysis experiments, the hydrolysis liquor was discarded after analysis and the solids were re-slurried in a fresh portion of distilled water.

spacings of the lines of greatest intensity for the high sodium reaction products ($x=14$ to 15) and their soluble fractions, are at 8.4, 5.38, and 4.63 angstroms (A pattern), while those for the low sodium reaction products ($x=6$ to $<14$) and their soluble fractions are at approximately 5.38, 4.63, and 2.48 angstroms (B pattern). The lines of major significance are shown below in Table III, wherein A and B are patterns for the original reaction products before leaching.

TABLE II

*Hydrolysis of Insoluble Fractions at 100° C.*

| No. | Test sample | Analysis of hydrolysis solution (gram atoms) Na-Al-P | Approximate Na:Al:P ratio in solids | Remarks |
|---|---|---|---|---|
| 1 | Reaction product | | 8.0:3:8.0 | Low sodium sample. |
| | Insoluble fraction | | 4.6:3:5.9 | Leached for 1 hr. at R.T. |
| | Initial slurry | 0 -0 -0 | | 580 gms. insoluble fraction in 2,000 ml. distilled H₂O. |
| | Hydrolysis: | | | |
| | After 2 days | 0.660-0.0006-0.585 | 3.5:3:4.6 | pH of hydrolysis soln.=5.9. |
| | After 5 days | 0.680-0.0010-0.605 | 2.3:3:3.6 | pH of hydrolysis soln.=5.8. |
| | After 9 days | 0.330-0.0007-0.288 | 2.0:3:3.3 | pH of hydrolysis soln.=6.1. |
| | After 12 days | 0.050-0.0008-0.040 | 2.0:3:3.3 | pH of hydrolysis soln.=6.6. |
| | After 19 days | 0.015-0.0007-0.010 | 2.0:3:3.2 | pH of hydrolysis soln.=7.0. |
| | After 26 days | 0.010-0.0007-0.007 | 2.0:3:3.2 | pH of hydrolysis soln.=7.3. |
| 2 | Reaction product | | 12.0:3:8.0 | Medium sodium sample. |
| | Insoluble fraction | | 6.4:3:5.5 | Leached for 1 hr. at R.T. |
| | Initial slurry | 0 -0 -0 | | 480 gms. insoluble fraction in 2,000 ml. distilled H₂O. |
| | Hydrolysis: | | | |
| | After 4 days | 0.390-0.0016-0.276 | 5.6:3:5.2 | pH of hydrolysis soln.=6.7. |
| | After 8 days | 0.270-0.0016-0.178 | 5.5:3:4.6 | pH of hydrolysis soln.=7.0. |
| | After 11 days | 0.104-0.0013-0.065 | 5.2:3:4.5 | pH of hydrolysis soln.=7.2. |
| | After 18 days | 0.132-0.0015-0.081 | 5.5:3:4.5 | Do. |
| | After 25 days | 0.141-0.0013-0.085 | 5.5:3:4.4 | Do. |
| | After 32 days | 0.162-0.0013-0.093 | 3.5:3:3.8 | pH of hydrolysis soln.=7.5. |
| 3 | Reaction product | | 15.0:3:8.0 | High sodium sample. |
| | Insoluble fraction | | 7.7:3:5.3 | Leached for 1 hr. at R.T. |
| | Initial slurry | 0 -0 -0 | | 400 gms. insoluble fraction in 2,000 ml. distilled H₂O. |
| | Hydrolysis: | | | |
| | After 4 days | 0.604-0.038 -0.254 | 7.0:3:4.9 | pH of hydrolysis soln.=10.6. |
| | After 8 days | 0.313-0.032 -0.128 | 7.0:3:4.8 | pH of hydrolysis soln.=10.5. |
| | After 11 days | 0.144-0.014 -0.061 | 7.0:3:4.8 | pH of hydrolysis soln.=9.8. |
| | After 18 days | 0.104-0.005 -0.050 | 6.8:3:4.5 | pH of hydrolysis soln.=9.5. |
| | After 25 days | 0.093-0.005 -0.045 | 7.1:3:4.4 | pH of hydrolysis soln.=9.3. |
| | After 32 days | 0.066- -0.033 | 5.8:3:4.5 | Do. |

Comparing the data from the first and third hydrolyses, above, it may be observed that the low sodium sample produced hydrolysis solutions which steadily increased in pH, while the high sodium sample steadily decreased in pH. In each case, as hydrolysis proceeded, the solution pH appeared to approach that of a pure disodium phosphate solution. From the analysis of the hydrolysis solution of the third reaction product, the final solution after 32 days contained essentially all disodium phosphate (pH=9.2).

When hydrolyzing the insoluble fractions containing a high sodium content (about 8–11 Na:3 Al), it has been observed that the X-ray pattern undergoes a gradual change from Pattern "A" to Pattern "B." Although the reason for this change is not fully understood, it appears likely that the crystalline portion of the insoluble fraction undergoes cleavage at Na—O—Al≡ linkages to form H—O—Al≡ linkages. This possibility would also account for the formation of trisodium phosphate which, theoretically, would not be formed directly by hydrolysis of the insoluble fraction, but which could result upon hydrolysis of Na—O—Al≡ linkages in the presence of disodium orthophosphate.

Due to the complex nature of the reaction products and the insoluble fractions, X-ray powder patterns have been found to be especially useful for characterizing these new substances. Each pattern will readily show the existence of a unique and distinct crystalline species plus the presence of any disodium orthophosphate. The d-

TABLE III

*X-ray Powder Patterns of Reaction Products*

| d-Spacing, A. | A pattern (Na=14–15), intensity [1] | B pattern (Na=6–14), intensity [1] |
|---|---|---|
| 8.4 | [1] 45 | [1] 40 |
| 7.7 | [2] 45 | [2] 40 |
| 6.4 | [2] 20 | [2] 20 |
| 5.38 | [1] 85 | [1] 80 |
| 4.94 | [2] 85 | [2] 80 |
| 4.63 | [1] 100 | [1] 100 |
| 3.94 | [2] 10 | [2] 10 |
| 3.81 | 0 | [1][2] 10 |
| 3.61 | [2] 40 | 0 |
| 3.53 | 0 | [2] 10 |
| 3.35 | [1] 20 | [1] 30 |
| 3.16 | [2] 20 | [2] 40 |
| 2.91 | [1] 40 | [1] 40 |
| 2.73 | 0 | [2] 35 |
| 2.57 | [1][2] 30 | [1][2] 50 |
| 2.54 | [2] 40 | 0 |
| 2.48 | [1][2] 50 | [1][2] 70 |
| 2.20 | [2] 10 | 0 |
| 2.08 | [2] 10 | [2] 10 |
| 1.94 | [2] 20 | [2] 10 |
| 1.90 | [2] 20 | [2] 10 |

[1] Line intensity estimated on a scale ranging between 0 (for no observable lines) to 100 (for lines of highest intensity).
[1] Lines for Na₂HPO₄·2H₂O.
[2] Lines for insoluble fraction.

In a preferred method of producing the reaction products of the invention, aluminum hydroxide is first reacted with concentrated phosphoric acid (e.g., 85% orthophosphoric acid) and then to this reaction mixture is added an aqueous, concentrated solution of sodium hydroxide. Normally, reaction will be accomplished under agitation and the reaction product will dry from the vigorous exothermic reaction without the addition of heat. If the sodium hydroxide solution is added rapidly (and this is preferred) steam will be quickly evolved and a fairly dry, particulate product will result normally within one or two minutes, and certainly within five minutes. In large-scale batch production, it is common for evolved steam to condense on cooler walls of the reaction vessel and flow back into the reaction mixture. Under such circumstances it will be necessary to thereafter remove such water in a drying step which may be accomplished in any conventional drying equipment such as a rotary dryer, kiln, kiln mill, etc. Drying temperatures up to about 150° C. are suitable without appreciable decomposition of the product.

The reaction between the aluminum compound and the phosphoric acid is not extremely vigorous and is only slightly exothermic; a temperature rise of 5–20° C. is normally observed. By comparison, the reaction between the sodium compound and phosphoric acid, or phosphoric acid-aluminum hydroxide reaction product, is extremely vigorous, with the rapid evolution of heat and steam. For this reason, it is preferable to first react the aluminum compound with the phosphoric acid (heating may be required to initiate the reaction) leaving the more vigorous reaction to be completed last and thereby utilizing heat of reaction to dry the final reaction product. As an alternative, the aluminum compound may be first added to the sodium hydroxide solution to form a mixture of sodium aluminate and sodium hydroxide which is thereafter added to the concentrated phosphoric acid. This latter procedure also produces a vigorous exothermic reaction.

The following specific examples illustrate the invention in the preparation of the novel reaction product compositions herein disclosed and claimed.

EXAMPLE 1

To 461.0 grams of 85% $H_3PO_4$ were added 117.0 grams of hydrated alumina. This mixture was then heated at a temperature between 60 and 80° C. in a Hobart mixer bowl until the alumina had substantially reacted, after which time 260.0 grams of 55% sodium hydroxide solution was rapidly added. After a short induction period (20 to 30 seconds) a vigorous reaction was observed with the evolution of steam and rapid condensation of the reaction product to a fine particulate mass. When the reaction had subsided, about 60 to 100 seconds, a dry granular product was recovered. This product was further dried at 80° C. in an oven and then milled. Analysis revealed 47.5% $P_2O_5$, 12.8% $Al_2O_3$, and 18.2% $Na_2O$ with a loss on ignition of 21.5%. Upon X-ray analysis, a weak pattern corresponding to Pattern B of Table III (without disodium phosphate lines) was observed.

EXAMPLE 2

The reaction product of Example 1 was leached under agitation in a 25% aqueous slurry at room temperature for one hour, then recovered (filtered), washed with water, and dried at 100° C. in an oven. The dried residue was analyzed and found to contain an Na:Al:P ratio of 3.7:3:5.3. The X-ray powder pattern of this residue was essentially the same as that of the reaction mixture of Example 1.

EXAMPLE 3

Hydrated alumina was reacted with 85% $H_3PO_4$ in the same quantities and using the same procedure described in Example 1. Four hundred and eight grams of 55% sodium hydroxide solution were then added rapidly to the hydrated alumina $H_3PO_4$ reaction product. The final reaction product was dried and milled in the manner shown in Example 1. Upon analysis, the reaction product was found to contain 25.6% $Na_2O$, 11.5% $Al_2O_3$, and 42.8% $P_2O_5$ with a loss on ignition of 20.1%. The X-ray pattern was essentially the same as that shown as Pattern B in Table III, supra.

EXAMPLE 4

The reaction product of Example 3 was leached under agitation in a 25% aqueous slurry at room temperature for one hour, washed thoroughly with water, and dried at 100° C. The solid residue was analyzed and found to contain a Na:Al:P ratio of 6:3:5.2. An X-ray powder pattern of the solid residue indicated Pattern B material, excluding the lines for disodium orthophosphate.

EXAMPLE 5

Using the procedure of Example 1, 461.0 grams of 85% $H_3PO_4$ were reacted with 117.0 grams of alumina and to the product was then added 555 grams of a 55% aqueous solution of sodium hydroxide. After reaction, the product was dried and milled. The analysis showed 31.0% $Na_2O$, 10.2% $Al_2O_3$, and 37.8% $P_2O_5$. Pattern A was found by X-ray. Lines for disodium orthophosphates were very sharp and pronounced.

EXAMPLE 6

The reaction product of Example 5 was leached for one hour in water and the insoluble portion recovered and dried. The insoluble portion, by analysis, was found to contain a Na:Al:P ratio of 9.9:3:5.3, and have an X-ray powder pattern the same as Pattern A of Table III, but excluding the lines therein for disodium orthophosphate.

The new compositions of the invention, both reaction products and insoluble fractions thereof, have been found to be highly desirable emulsifying agents for process cheese. By definition, pasteurized process cheese is a food product prepared by comminuting and mixing, with the aid of heat, and the addition of a small amount of emulsifying agents, not exceeding 3% of the total weight of the finished product, one or more cheeses of the same or different varieties. Many cheese varieties, e.g., American Cheddar, Swiss, Brick, Limburger, etc., are today available in pasteurized process form. In the cooking and preparation of cooked cheese foods, process cheese has many advantages over natural cheese. It melts smoothly and quickly without fat separation or stringiness. Because it may be prepared as a blend of various types of cheese, balanced flavors and textures may be produced. But perhaps the most important characteristic of process cheese is its excellent keeping qualities. For although cheeses of all types have fairly long keeping quality, they are, nevertheless, perishable in varying degree. Some varieties, e.g., Parmesan, have a long life, while others, e.g., Camembert, are at their best for only a very short time. The natural ripening process which yields the distinctive cheese flavors and textures does not cease when the cheeses have reached their prime. Further loss by deterioration or drying out of the cheese has long been a problem to the cheese manufacturer.

Much like the milk from which it is produced, cheese is a complex food product. The final acidity of the cheese and the flavor are mainly influenced by the means used to prepare the cheese curd and the curing conditions of the final curd. The palpable qualities of a commercially desirable cheese include smooth texture, high resiliency, softness, moistness, pleasing flavor, and the like. Color, a feature of localized consumer preferences, is easily controlled by the addition of pure vegetable coloring matter to the milk.

It has been estimated that about 55% of the cheese produced in the United States is of the process type, and presumably a large portion of this is ultimately utilized in the preparation of cooked cheese dishes. Natural cheese is less suitable for cooking since the fat tends to separate from the casein when the cheese is subjected to heat. Fat separation is prevented in process cheese by the use of emulsifying agents, i.e., sodium phosphates and sodium citrate. All common sodium phosphates, with the possible exception of sodium tripolyphosphate and the cyclic metaphosphates (tri- and tetrameta-), may be utilized in cheeses and cheese foods. But the orthophosphates are almost exclusively used in process cheese in the United States. Pyrophosphates such as tetrasodium pyrophosphate, produce a somewhat bitter flavor in the final cheese, while sodium tripolyphosphate usually produces a non-melting cheese. The predominantly long chain phosphates, such as sodium hexametaphosphate, tend to produce a brittle non-melting cheese which may be improved somewhat by buffering to higher pH. But for one notable exception, mixtures of the various sodium phosphates may be freely used as the emulsifying ingredients in cheese. The exception is pyrophosphate-orthophosphate mixtures which somehow interact to produce a non-melting, rather undesirable cheese product.

Although disodium orthophosphate is highly satisfactory in preventing fat separation from cheeses, its use is limited by the possible formation of crystals (almost always $Na_2HPO_4 \cdot 12H_2O$) in the final cheese product. This limitation may be a problem if a disodium orthophosphate concentration of about 1.6% (finished cheese basis) is exceeded. Although citrates are themselves crystal formers (calcium citrate crystals), the two types of crystals apparently form independently of each other. For this reason, citrates may be used as auxiliary emulsifiers when 1.6% disodium phosphate will not completely emulsify the particular cheese variety. However, the use of citrate with disodium orthophosphate is also limited by certain interactions between the two anions.

It is clear that the emulsifying agents presently available are not entirely satisfactory for use in process cheese. In American process cheese, food regulations permit the use of emulsifiers up to a level of 3% by weight of the final cheese, but because of the limitations caused by the formation of crystals with the known phosphate emulsifiers, they cannot normally be used at levels above about 2% by weight. This is true in spite of a need to emulsify cheeses extremely degraded by bacterial action or having certain other poorly defined characteristics.

The compositions of the present invention have many advantages over the sodium phosphates and citrates used heretofore in emulsifying cheese products. The new compositions can provide different pH levels furnishing flexibility in changing the characteristics of the cheese. An immediate development of melt is produced when cheese is emulsified with the novel compositions, whereas, with disodium orthophosphate, a curing period of anywhere from 7 to 15 days is necessary before adequate melt will develop. The formation of crystals is completely eliminated at the allowable levels of emulsifying agent. Further, emulsification produced by the new compositions is actually superior to that of the known emulsifying agents since there is less tendency for leakage of fats during heating of a cheese containing the compositions than with an equivalent amount of disodium phosphate. The physical properties of the cheeses produced with the new compositions have been found to be equivalent to those furnished by disodium orthophosphate and in some cases actually superior.

The following specific examples illustrate the properties of the novel compositions of the invention when incorporated in pasteurized process cheese.

EXAMPLE 7

Three different reaction product compositions were first prepared by the methods illustrated in Examples 1 through 6, supra. These compositions were thereafter utilized in process cheese in their original form, that is, without leaching off the soluble fraction. The analyses of these three compositions are as follows:

Composition I_____ 14.4% Na; 6.5% Al; 20.3% P; and 22.5% loss on ignition.
Composition II_____ 21.9% Na; 6.2% Al; 18.6% P; and 19.6% loss on ignition.
Composition III_____ 23.3% Na; 5.4% Al; 17.3% P; and 20.1% loss on ignition.

A blend of natural Wisconsin Cheddar cheeses was first formulated using 15% mild cheese, 70% medium cheese, and 15% aged cheese. The cheese was ground through a meat grinder with a ⅛ inch plate. Forty pounds of cheese was used per test. One pound of each of the various phosphate emulsifying agents was added just before addition of the last of the cheese to the cooker. The cooker was a forty pound pilot plant unit with a screw for mixing and means for injection of steam. The screw was driven through an essentially closed cylinder. The cheese was therefore not easily recirculated nor could it escape the action of the screw. Typical commercial cookers have some clearance above the screw allowing recirculation, and for some of the cheese to escape direct action by the screw. Each cheese batch was normally cooked for a period of between three to seven minutes (after phosphate addition) at 160° F. The cheese was then mixed one minute at 160° F., poured into five pound cheese cartons, and heat-sealed by inverting the box with liner. The final cheese was pre-cooled at room temperature and held overnight at 45° F. in a cooler. The samples were then sliced on a rotating circular blade type slicer, packaged in moisture impermeable film, and stored for a period of one month under temperatures of 90° F., room temperature, 55° F., and 35° F. The resulting properties of the test cheeses are summarized in the following table.

TABLE IV

*Effect of Various Emulsifying Agents on Blended Process Cheese*

| Emulsifying agent(s) (2.5% of final cheese) | Cheese, pH | Melt, percent | Bloom (hardness) reading | | Break characteristics | Crystals one month |
|---|---|---|---|---|---|---|
| | | | Initial | Final (35° F.) | | |
| DSP | 5.57 | 21 | 336 | 328 | Straight | Moderate. |
| Composition I | 5.20 | 10 | 518 | 408 | Mod. jagged | None. |
| Composition I plus 20% TSP | 5.43 | 11 | 351 | 346 | V. sl. jagged | Do. |
| Composition I plus 40% STPP | 5.29 | 4 | 500+ | 500+ | Trace jagged | Do. |
| Composition I plus 20% SHMP | 5.09 | 7 | 500+ | 450 | Jagged | Do. |
| Composition II | 5.53 | 26 | 284 | 276 | Sl. jagged | Do. |
| Composition II plus 20% TSP | 5.72 | 8 | 224 | 248 | do | Do. |
| Composition II plus 20% SHMP | 5.32 | 1 | 500+ | 348 | Straight | Do. |
| Composition III | 5.72 | 18 | 257 | 267 | V. sl. jagged | Do. |
| Composition III plus 20% SHMP | 5.51 | 8 | 335 | 317 | Straight | Do. |
| DSP | 5.59 | 7 | 334 | 312 | Trace jagged | Slight. |

NOTE.—DSP = disodium orthophosphate; TSP = trisodium phosphate; STPP = sodium tripolyphosphate SHMP = sodium hexametaphosphate; Mod. = moderate; Sl. = slight; V. sl. = very slight.

In the above table, break characteristics and crystal formation were evaluated visually. It will be noted that both samples containing disodium phosphate produced crystal growth within one month of manufacture. None of the samples containing the reaction products of the invention showed any crystal growth. Melt percent was determined by cutting cores from the cheese samples with a ⅞ inch (No. 15) cork borer, placing these discs in the bottom of stainless steel beakers, and melting the discs in a boiling water bath for four minutes. The diameter of the cheese disc after the melt test was determined, and the melt reported as the percentage increase in diameter of the disc. Break characteristics were determined by cutting slices of cheese and bending the same over double while at room temperature. A Bloom gelometer was used to measure the hardness of the cheese samples. This instrument employs a varying weight load to drive a piston through a cheese sample of given dimensions. The weight required to drive a ½ inch diameter plunger 4 mm. into the cheese is reported herein as the "Bloom" reading. During the test, the cheese was held at room temperature. Initial Bloom readings were made the day following preparation of the cheese, and final readings were made at fifteen days.

Only Composition III (the most alkaline of the three experimental compositions) would be rated as equal or superior to DSP in emulsification and effect upon cheese characteristics. All three compositions produced better melt characteristics than DSP, especially after aging at low temperatures. The use of other phosphates in combination with the three compositions, in general, altered the properties of the cheese in the predicted fashion.

EXAMPLE 8

The experiments of this example were performed to determine the relative effect of certain reaction products, and insoluble fractions thereof, as emulsifying agents in mild and sharp cheeses. Also, it was desired to learn what portion the emulsifying activity of the compositions result from the soluble fraction and the insoluble fraction. The compositions tested had the following analyses:

Composition IV _____ 13.8% Na; 7.1% Al; 21.2% P; and 20.8% loss on ignition.
Composition IV (insoluble fraction) _____ 8.0% Na; 16.9% Al; and 14.2% P.
Composition V _____ 19.3% Na; 6.0% Al; 16.4% P; and 25.5% loss on ignition.
Composition V (insoluble fraction) _____ 16.6% Na; 11.2% Al; and 17.7% P.

Mild and sharp Cheddar cheese (approximately one month and one year old, respectively) were selected for the present experiments. The mild cheese had a water content of 36.5% and a fat content (dry weight basis) of 51.9%, while the sharp cheese had a water content of 38.7% and a fat content of 50.6%. For each batch of process cheese, 300 grams of Cheddar was first cut into fine pieces and placed in a Mirro aluminum double boiler. The double boiler was then partly immersed in boiling water. Seven and a half grams of the candidate phosphate emulsifying agent was slurried in water and added to the cheese with the aid of a silent policeman. The cheese was further heated in boiling water and steamed to a temperature of about 140 F. The propeller of a Model L Lightnin mixer was then lowered into the double boiler and mixing started. The cheese was thereafter heated with stirring to 161–164° F. and, finally, poured into three 150 ml. metal beakers. After cooling at room temperature, the cheese pH was determined. Samples were stored in a refrigerator overnight. After overnight storage, one sample was layered with paraffin and held for fifteen days' evaluation. At fifteen days, the cheese was evaluated for meltability, slicing characteristics, break, and resiliency. The results of these tests are presented in Table V which follows:

TABLE V
Relative Effect of Soluble and Insoluble Fractions on Emulsification [1]

| | Composition IV | | Composition IV insoluble fraction | | Composition V | | Composition V insoluble fraction | |
|---|---|---|---|---|---|---|---|---|
| | Mild cheese | Sharp cheese | Mild cheese | Sharp cheese | Mild cheese | Sharp cheese | Mild cheese | Sharp cheese |
| Percent meltability, 1 day. | 16.5 | 79.5 | 77.3 | 104.0 | 65.4 | 132.0 | 59.0 | 77.3 |
| Percent meltability, 15 days. | 6.3 | 34.8 | 66.3 | 81.2 | 65.4 | 98.1 | 53.5 | 77.3 |
| Melt characteristics, 15 days. | V. sl. spread, fat sep. | Sl. spread grainy, pronounced fat separation. | Uniform no fat separation | Uniform sl. fat separation. | Uniform no fat separation. | Uniform v. sl. grainy, tr. fat separation. | Uniform no fat separation. | Uniform sl. fat separation. |
| Sliceability, 15 days | Mod. smooth. | V. rough | Smooth | Sl. rough | Mod. smooth. | Mod. rough | Mod. smooth. | Rough. |
| Break, 15 days | V. jagged | Jagged | None, tears straight. | Sl. jagged | None, tears straight. | Jagged | None, tears straight. | Jagged. |
| Resiliency, 15 days | V. sl. res | None, poorly knit. | Resilient | Sl. res | Resilient | Trace res. soft. | Resilient | Sl. res. |
| Cheese, pH | 5.02 | 5.39 | 5.19 | 5.38 | 5.49 | 5.59 | 5.48 | 5.79. |
| Emulsion characteristics | No fat sep., v. pourable. | No fat sep., v. pourable, mealy. | No fat sep., v. pourable stringy after cooling. | No fat sep., v. pourable sl. stringy when cool. | No fat sep., v. pourable. | Fat out and in, pourable. | No fat sep., v. pourable. | No fat sep., pourable, stringy when cool. | No fat v. pourable, sl. stringy. |

[1] Cheese pH's without phosphate: Mild 5.23, sharp 5.56.

The data of the above table indicate that both the reaction products and the insoluble fractions prevent gross separation of fat in melted cheese. Not only do the compositions retain their ability to emulsify cheese when the soluble fraction is removed, but in one instance, with Composition IV, the insoluble fraction actually produces better emulsification than the original composition. It may be observed that in all of the tests emulsification was better with young or mild cheeses. Although not shown in the table, none of the cheeses formed crystals at the 2.5 weight percent of emulsifying agent.

EXAMPLE 9

Using the procedure described in Example 8, test samples of process cheese containing various levels of emulsifier and mixtures of emulsifiers, were prepared. The insoluble fraction of Composition III, having an analysis of 23.9% Na, 9.1% Al, and 19.6% P, was used. The emulsion characteristics observed during preparation of the cheese were observed. The following table shows the results of these experiments.

agent is largely responsible for the formation of crystals, the quality of the cheese used can be a very important factor in the ultimate formation of crystals. Thus, cheese containing 6, 7, and even 8% of the emulsifying com-

TABLE VI

*Effects of Alkaline Insoluble Fractions on the Characteristics of Process Cheese*

| Emulsifying agent | Cheese, pH | Emulsion characteristics | Melt, percent | | Break | Oiling off [1] | Bloom | | Resil.[2] | Crystal formation |
|---|---|---|---|---|---|---|---|---|---|---|
| | | | Init. | 15 day | | | Init. | 15 day | | |
| (1) None | 5.38 | No fat out, v. stiff, v. pourable. | 92 | 89 | None, jagged tear. | Pronounced. | 190 | 190 | Trace | None. |
| (2) 3.0% DSP | 6.26 | Fat out and not quite all in, sl. stiff, mod. pourable. | 63 | 60 | Sl. jagged | Mod | 285 | 260 | V. sl | Mod. |
| (3) 3.0% comp. III, insolubles. | 6.09 | Trace fat out and in, v. stiff, mod. pourable, sl. stringy. | 31 | 29 | Mod. jagged | V. sl | 345 | 330 | Sl | None. |
| (4) 2.5% DSP | 6.19 | Mod. fat out and not all in, v. pourable. | 6 | 46 | Straight | Sl | 330 | 240 | V. sl | V. sl. |
| (5) 2.5% comp. III, insolubles. | 5.99 | Sl. fat out and in, v. stiff, mod. pourable, Sl. stringy. | 51 | 51 | Sl. jagged | Mod | 275 | 285 | Sl | None. |
| (6) 2.0% DSP | 5.91 | Trace fat out and not quite all in, v. pourable. | 6 | 50 | Straight | Mod. sl | 285 | 260 | V. sl | Trace. |
| (7) 2.0% comp. III, insolubles. | 5.89 | Fat not out, v. stiff, rubbery, stringy, sl. pourable. | 10 | 10 | Sl. jagged | Trace | 365 | 385 | Mod | None. |
| (8) 1.6% comp. III, insolubles 0.4% SHMP. | 5.69 | Fat out, v. sl., and in, stiff pourable. | 48 | 59 | None, straight tear. | V. sl | 235 | 235 | Mod | Do. |

[1] Oiling off is a qualitative measure of fat separation.
[2] Resiliency is a measure of the deformability of cheese.

EXAMPLE 10

This experiment was conducted to determine the optimum possible concentration of the new compositions in process cheese without the formation of crystals. The process cheese samples were prepared in the manner shown in Example 8. The results of these experiments are shown in the following table.

positions of the invention have been found to be free of crystals when the natural cheese was of an inherently high quality. On the other hand, crystals have been found to form in low quality cheeses at composition levels even below 5 or 6%.

Although not capable of quantitative evaluation, a highly important advantage of the compositions of the

TABLE VII

*Effect of Emulsifying Agent Concentration on Process Cheese*

COMPOSITION III

| Emulsifying agent | Cheese, pH | Melt | | Hardness | | Fat leakage | | Crystals |
|---|---|---|---|---|---|---|---|---|
| | | Init. | 15 days | Init. | 15 days | In melt | On paper | |
| 2% DSP | 5.8 | 9 | 33 | 295 | 240 | None | Trace | Trace |
| 3% DSP | 6.2 | 25 | 64 | 190 | 205 | do | V. sl | Mod. |
| 2% composition III | 5.7 | 42 | 65 | 155 | 145 | do | V. sl | 0. |
| 3% composition III | 5.9 | 30 | 53 | 155 | 135 | do | V. sl | 0. |
| 4% composition III | 6.2 | 25 | 32 | 200 | 170 | do | V. sl | 0. |
| 5% composition III | 6.4 | 10 | 15 | 210 | 225 | do | Trace | Trace. |
| 6% composition III | 6.6 | 4 | 2 | 500 | 395 | do | do | Sl. |

COMPOSITION II

| 2% DSP | 5.8 | 10 | 77 | 195 | 195 | None | V. sl | Trace. |
| 3% DSP | 6.2 | 28 | 55 | 195 | 230 | Trace | V. sl | Mod. |
| 2% composition II | 5.4 | 38 | 82 | 140 | 210 | None | Sl | 0. |
| 3% composition II | 5.5 | 30 | 51 | 135 | 215 | do | Sl | 0. |
| 4% composition II | 5.7 | 20 | 58 | 150 | 195 | do | Sl | 0. |
| 5% composition II | 5.8 | 28 | 31 | 165 | 210 | do | Sl | 0. |
| 6% composition II | 5.9 | 4 | 6 | 290 | 230 | do | Trace | Trace. |

It may be observed from the data of Table VII that the compositions may be used as emulsifying agents at concentrations up to 5 or 6% without the formation of crystals. In special cases, the compositions may be added at concentrations even higher than 6% since these higher concentrations would present no greater a crystal problem than cheese products currently sold commercially. Although the concentration of the emulsifying present invention is their negligible effect upon the flavor of process cheese, even after prolonged storage (many months and even years). The citrates of the prior art also exhibit this desirable feature. But the phosphates and polyphosphates used heretofore as cheese emulsifying agents will sometimes impart a bitterness (especially at high concentrations) to the flavor of the final cheese.

This so-called "phosphate taste" normally appears thirty or forty days after the cheese is processed.

While primarily used with Cheddar cheeses (the process form widely known as "American") the novel compositions may serve as the emulsifying agents in any of the many process cheeses, whether said cheeses are prepared from one or more natural cheeses of the same variety or of different varieties. Among the process cheeses which may include the compositions are the "regular" process cheeses such as American Cheddar, Swiss, Brick, Limburger, Camembert, Gouda, Edam, Gruyere, Muenster, and Blue cheese; the cheese foods (which mainly differ from regular process cheese by the fat, water, phosphorus and calcium content); and the cheese spreads (e.g., Velveeta). The so-called "imitation cheese spreads" which usually contain certain vegetable gums and higher water and/or lower fat content than regular process cheese may also utilize the compositions. Where not controlled by law, the compositions may be used at levels at least as high as 10% by weight of the final cheese, but preferably at levels between about 0.5% and 5.0% by weight of the final cheese.

The foregoing detailed description has been given for clearness of understanding only, and no unnecessary limitations should be understood therefrom, as modifications will be obvious to those skilled in the art.

What we claim is:

1. A sodium aluminum phosphate reaction product composition prepared by exothermically reacting under agitation a compound selected from the group consisting of aluminum oxide, aluminum hydroxide, sodium aluminate, and mixtures thereof, and a compound selected from the group consisting of sodium hydroxide, sodium carbonate, and mixtures thereof, with orthophosphoric acid, the proportions being selected to furnish between 6 and 15 gram atoms of sodium and between 1.5 and 4.5 gram atoms of aluminum for each 8 gram atoms of phosphorus; removing any excess water from the reaction mixture and recovering the dried particulate sodium aluminum phosphate reaction product composition.

2. A water insoluble, hydrolyzable sodium aluminum phosphate composition prepared by exothermically reacting under agitation a compound selected from the group consisting of aluminum oxide, aluminum hydroxide, sodium aluminate, and mixtures thereof, and a compound selected from the group consisting of sodium hydroxide, sodium carbonate, and mixtures thereof, with orthophosphoric acid, the proportions being selected to furnish between 6 and 15 gram atoms of sodium and between 1.5 and 4.5 gram atoms of aluminum for each 8 gram atoms of phosphorus; leaching the water soluble fraction from the reaction mixture and drying and recovering the water insoluble fraction.

References Cited in the file of this patent

UNITED STATES PATENTS

| | | |
|---|---|---|
| 252,029 | Gibbons et al. | Jan. 10, 1882 |
| 2,251,496 | Parsons | Aug. 5, 1941 |
| 2,564,374 | Roland | Aug. 14, 1951 |
| 2,909,451 | Lawler et al. | Oct. 20, 1959 |